(12) United States Patent
Mischke et al.

(10) Patent No.: US 11,840,249 B2
(45) Date of Patent: Dec. 12, 2023

(54) METHOD FOR SUPPORTING A DRIVER DURING A MANUAL PARKING PROCEDURE OF A MOTOR VEHICLE, WHEREIN A FIRST AND A SECOND INDICATOR ARE ACQUIRED, PARKING ASSISTANCE SYSTEM, AND MOTOR-VEHICLE

(71) Applicant: Valeo Schalter und Sensoren GmbH, Bietigheim-Bissingen (DE)

(72) Inventors: Uwe Mischke, Bietigheim-Bissingen (DE); Fabian Thunert, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 451 days.

(21) Appl. No.: 16/758,652

(22) PCT Filed: Oct. 10, 2018

(86) PCT No.: PCT/EP2018/077551
§ 371 (c)(1),
(2) Date: Apr. 23, 2020

(87) PCT Pub. No.: WO2019/081204
PCT Pub. Date: May 2, 2019

(65) Prior Publication Data
US 2020/0346660 A1    Nov. 5, 2020

(30) Foreign Application Priority Data
Oct. 26, 2017    (DE) ...................... 10 2017 125 107.3

(51) Int. Cl.
*B60W 50/14*    (2020.01)
*B60W 10/18*    (2012.01)
(Continued)

(52) U.S. Cl.
CPC ............ *B60W 50/14* (2013.01); *B60W 10/18* (2013.01); *B60W 10/30* (2013.01);
(Continued)

(58) Field of Classification Search
None
See application file for complete search history.

(56) References Cited

U.S. PATENT DOCUMENTS

2016/0159397 A1*   6/2016   Baek ...................... B60W 30/06
                                                                    701/41
2017/0355307 A1*   12/2017   Ha ........................ G08G 1/143

FOREIGN PATENT DOCUMENTS

DE          10336985 A1    3/2005
DE    102006032171 A1    1/2008
(Continued)

OTHER PUBLICATIONS

Espacenet translation of DE102012221036A1 (Year: 2014).*
(Continued)

*Primary Examiner* — James J Lee
*Assistant Examiner* — Andrew Sang Kim
(74) *Attorney, Agent, or Firm* — Osha Bergman Watanabe & Burton LLP

(57) ABSTRACT

A method for supporting a driver of a motor vehicle in a manual parking procedure of the motor vehicle in a surroundings of the motor vehicle, is disclosed. At least one indicator characterizing the parking procedure is acquired and, depending on an evaluation of the indicator, a performance of a parking procedure is recognized and, depending thereon, at least one parking-procedure-specific function of the motor vehicle is activated to support the driver during the parking procedure, wherein a performance of the parking procedure is recognized when at least a first indicator that characterizes the parking procedure in a surroundings-spe-
(Continued)

Figure 1:
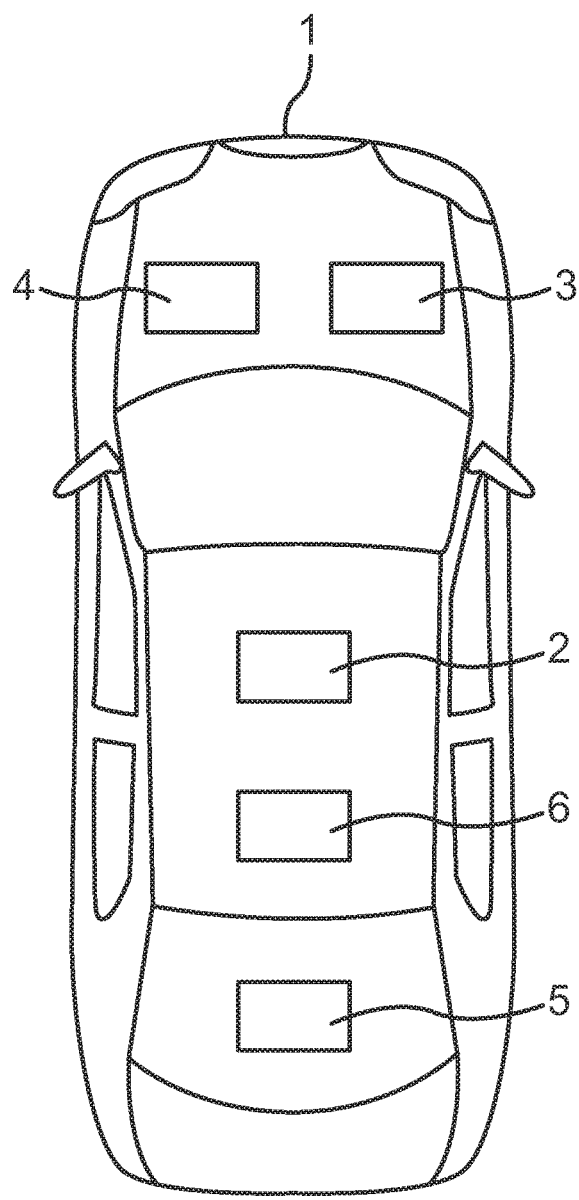

cific manner is acquired and if, after the acquisition of the first indicator, at least one second indicator that characterizes the parking procedure in a motor-vehicle-specific manner is acquired.

11 Claims, 2 Drawing Sheets

(51) Int. Cl.
    *B60W 10/30*     (2006.01)
    *B60W 50/04*     (2006.01)
    *G06N 3/04*     (2023.01)
    *G06N 3/08*     (2023.01)

(52) U.S. Cl.
    CPC ............. *B60W 50/045* (2013.01); *G06N 3/04* (2013.01); *G06N 3/08* (2013.01)

(56) References Cited

FOREIGN PATENT DOCUMENTS

| DE | 102006052575 | A1 | | 5/2008 | | |
|----|--------------|----|----|--------|----|----|
| DE | 102006058213 | A1 | | 7/2008 | | |
| DE | 102009039084 | A1 | * | 3/2011 | ......... | B62D 15/0285 |
| DE | 102010008545 | A1 | | 8/2011 | | |
| DE | 102011082477 | A1 | | 3/2013 | | |
| DE | 102012221036 | A1 | | 5/2014 | | |
| DE | 102014115334 | A1 | | 4/2016 | | |
| DE | 102014018189 | A1 | | 6/2016 | | |
| DE | 102015211732 | A1 | * | 12/2016 | ......... | B62D 15/0285 |
| DE | 102017102133 | A1 | | 8/2017 | | |
| DE | 102017107626 | A1 | | 10/2017 | | |
| EP | 1470977 | B1 | * | 5/2006 | ......... | B60K 31/0008 |
| EP | 2289768 | A2 | | 3/2011 | | |

OTHER PUBLICATIONS

Espacenet translation of DE102015211732A1 (Year: 2016).*
Espacenet translation of EP1470977B1 (Year: 2006).*
Espacenet translation of DE102009039084 (Year: 2011).*
International Search Report issued in corresponding International Patent Application No. PCT/EP2018/077551, dated Jan. 22, 2019 (6 pages).
Written Opinion issued in corresponding International Patent Application No. PCT/EP2018/077551, dated Jan. 22, 2019 (7 pages).
German Search Report issued in corresponding German Application No. 10 2017 125 107.3, dated Jun. 29, 2018 (6 pages).

* cited by examiner

METHOD FOR SUPPORTING A DRIVER DURING A MANUAL PARKING PROCEDURE OF A MOTOR VEHICLE, WHEREIN A FIRST AND A SECOND INDICATOR ARE ACQUIRED, PARKING ASSISTANCE SYSTEM, AND MOTOR-VEHICLE

The invention relates to a method for supporting a driver of a motor vehicle during a manual parking procedure of the motor vehicle in a surroundings of the motor vehicle. At least one indicator characterizing the parking procedure is acquired and, depending on an evaluation of the indicator, a performance of a parking procedure is recognized and, depending thereon, at least one parking-procedure-specific function of the motor vehicle is activated to support the driver during the parking procedure. The invention further relates to a parking assistance system and a motor vehicle.

In order to be able to use an assistance system for supporting a driver, in particular a parking assistance system, in a particularly advantageous manner, it is important to recognize the situation in which the motor vehicle is at the time. During a parking procedure in particular, assistance functions should be configured actively or differently than in a driving situation of the motor vehicle. It is, in particular, necessary that the performance of a parking procedure can be recognized reliably. Parking assistance systems that activate different assistance systems during an automatic parking procedure are already known from the prior art. It is furthermore possible that further assistance systems are also switched on or off during an at least semi-autonomous parking procedure.

DE 10 2006 058 213 A1 discloses a motor vehicle parking assistance system. The motor vehicle comprises a measuring device for acquiring the vehicle speed and a control device that is configured in such a way that the parking assistance system is activated autonomously as soon as the vehicle speed lies within a predefined speed range.

DE 10 2012 221 036 A1 furthermore discloses a method for automatically switching on a parking and/or manoeuvring assistance system on the basis of the behaviour of the driver's view. The behaviour of the driver's view is ascertained and evaluated. The parking and/or manoeuvring assistance system is switched on depending on the evaluation of the view behaviour. In the context of the evaluation of the behaviour of the view, an intention of the driver to park or manoeuvre is detected on the basis of the driver's view behaviour, and then, depending on the parking and/or manoeuvring intention that has been detected, the parking and/or manoeuvring assistance system is switched on automatically.

The object of the present invention is to create a method, a parking assistance system and a motor vehicle by means of which a manual parking procedure is recognized reliably.

This object is achieved by way of a method, a parking assistance system and a motor vehicle in accordance with the independent claims.

One aspect of the invention relates to a method for supporting a driver of a motor vehicle during a manual parking procedure of the motor vehicle in a surroundings of the motor vehicle. At least one indicator characterizing the parking procedure is acquired and, depending on an evaluation of the indicator, a performance of a parking procedure is recognized and, depending thereon, at least one parking-procedure-specific function of the motor vehicle is activated to support the driver during the parking procedure.

A performance of the parking procedure is recognized when at least a first indicator that characterizes the parking procedure in a surroundings-specific manner is acquired and, if, after the acquisition of the first indicator, at least one second indicator that characterizes the parking procedure in a motor-vehicle-specific manner is acquired.

Through, in particular, the acquisition of the first indicator that characterizes the parking procedure in a surroundings-specific manner and of the second indicator that characterizes the parking procedure in a motor-vehicle-specific manner it is thus possible to deduce a manual parking procedure reliably, so that the parking-procedure-specific function can be activated reliably to support the driver of the motor vehicle. In this way it is possible to prevent an incorrect interpretation of the driving manoeuvre from occurring through the acquisition of only one of the two indicators and that an incorrect activation of the parking-procedure-specific function might be carried out, which could lead to a critical situation in the road traffic. Through the acquisition of the at least first and second indicator, a critical situation in the road traffic can thus be prevented.

It is, in other words, possible, in particular during a driving operation of the motor vehicle, for various surroundings-specific indicators to be evaluated, and only after the evaluation of the surroundings-specific indicator is attention paid to the motor-vehicle-specific indicator. If the motor-vehicle-specific indicator also satisfies a specific criterion, it can be assumed that the motor vehicle is in a parking procedure.

The detection of at least two parking spaces in the course of a predefined path distance can, for example, be considered as a surroundings-specific indicator. As a surroundings-specific indicator it is, furthermore, possible to detect whether a few parking spaces have already been recognized in a predefined path distance travelled, so that the motor vehicle is located in a car park and the driver would himself like to park the motor vehicle in the near future. Reaching a destination position which has been, in particular, entered into a global navigation satellite system (GNSS) can equally be acquired as a surroundings-specific indicator. It is furthermore possible, for example through the recognition of traffic signs, for example a speed limit for the motor vehicle and/or a car park sign, to deduce a future parking procedure. It is also possible that a detection of for example a multi-storey car park or a car park is reported by an external control device, for example by a navigation device and/or by data services, so that the parking assistance system knows that it is located in a car park. GNSS reference points can, furthermore, be used, so that the vehicle can, for example, "remember where it has already been" on the basis of the reference points, and that a multi-storey car park or a car park is recognized again. It is also possible that a light sensor is employed, in combination with a clock time, as a surroundings-specific indicator so that, for example, entry into "dark" surroundings during the day can be ascertained, whereupon a multi-storey car park can be deduced. An incline, for example that of a ramp in a multi-storey car park, can further be recognized as a surroundings-specific indicator. If the motor vehicle travels over a short path with a strong gradient, it could in particular here be a ramp of a multi-storey car park. Strong inclines following each other shortly in sequence can, further, be recognized as alternating ramps in a multi-storey car park. It is also possible that a multi-storey car park can be recognized when driving along a 360° curve. Such 360° curves are in particular followed when ascending in the multi-storey car park. A multi-storey car park can, in particular, be reliably recognized when an incline and a 360° curve are recognized. It can further be provided that typical radii of a multi-storey car park ascent are recognized and can thus be employed as a surroundings-specific indicator.

A predefined vehicle trajectory, for example an S-curve, an X perpendicular forward movement or an I perpendicular reverse movement, can in particular be acquired as a motor-vehicle-specific indicator. It is also possible that the braking of the vehicle when moving freely without the detection of an object by a camera and/or a radar and/or an ultrasonic sensor of the motor vehicle is acquired as the motor-vehicle-specific indicator. Further, the acquisition of a longer free travel at low speed, which can be interpreted as the search for a parking space, in particular when no motor vehicles are reported in front or when in general a higher speed limit applies, is acquired as the motor-vehicle-specific indicator. An accelerator pedal position—there is not much acceleration and it is not strong when manoeuvring—can further be recognized as, in particular, a motor-vehicle-specific indicator. An acceleration of the motor vehicle can also be acquired as a motor-vehicle-specific indicator, since in particular there is little acceleration when manoeuvring. A steering angle can, further, be acquired as a motor-vehicle-specific indicator, since, in particular during a parking procedure, a strong steering angle is used whereas high steering angles are not recorded when the motor vehicle is driving on the road other than during a parking procedure. A predefined time after which the motor vehicle has been in a predefined manoeuvring mode can also be acquired as a motor-vehicle-specific indicator, so that this manoeuvring mode is only active for a predefined period of time. A predefined path distance after the motor vehicle is in a manoeuvring mode can also be acquired as a motor-vehicle-specific indicator, and the parking-procedure-specific function thus only activated for a predefined path distance. It can further be provided that an actuation device is arranged in the motor vehicle that can be actuated by the driver himself, whereby the driver indicates a manual parking procedure to the parking assistance system. A low motor vehicle speed, in particular over a longer path distance and/or over a longer time, can further be acquired as a motor-vehicle-specific indicator in order to recognize the manual parking procedure. Engaging a reverse gear can also be acquired as a motor-vehicle-specific indicator.

A performance of a manual parking procedure can, for example, be recognized on reaching the destination position as a surroundings-specific indicator and with a high steering angle as the motor-vehicle-specific indicator.

According to a further form of embodiment, a performance of the parking procedure can be recognized after acquiring the exceeding of a predefined indicator threshold value of the first indicator and after acquiring the second indicator. A ramp of a multi-story car park can, for example, only be recognized at a specific threshold value of the incline, so that conclusions as to a multi-story car park can be drawn by means of the first indicator. It is also possible that, for example, the parking assistance system only concludes that it is located in a multi-storey car park when a light sensor exceeds or falls below a threshold light value by a predefined amount. The indicator threshold value can, for example, be stored on a storage medium and/or the indicator threshold value can be specified by a driver of the motor vehicle. It is thus possible that a performance of the parking procedure is only recognized after the predefined indicator threshold value has been exceeded and after the acquisition of the second indicator which can, for example, be a strong steering angle. An even more reliable recognition of the manual parking manoeuvre is provided in this way, so that, in particular, a critical situation can be better prevented.

In a further exemplary embodiment, a performance of the parking procedure can be recognized after an acquisition of at least two different first indicators and after the acquisition of the second indicator. In this way in particular, the performance of the parking procedure is only recognized after the acquisition of at least two surroundings-specific indicators and after the acquisition of the second indicator. The first indicators are, in particular, different; one of the first indicators can, for example, be a GNSS position, as the destination position, and a car park sign detected by a camera can, for example, be the second first indicator. In particular then, the parking procedure is only reliably recognized when both first indicators are acquired and the second indicator which can, for example, be an accelerator pedal position of the motor vehicle, is acquired. In this way a critical situation of the motor vehicle is yet better prevented.

According to a further exemplary embodiment, the at least one first indicator is evaluated in terms of a probability of a parking procedure, and a performance of the parking procedure is recognized after a predefined parking procedure threshold probability value is exceeded and after the acquisition of the second indicator. The first indicators can, in particular, have a different parking procedure probability, wherein a respective parking procedure probability value is assigned to each of the different first indicators. The respective parking procedure probability values can, for example, be stored on a storage medium and/or the respective parking procedure probability values can be specified by a driver of the motor vehicle. The parking procedure probability values can change in the course of driving operation. It can, for example, be provided that reaching a destination position already entails a very high parking procedure probability, so that during an approach of the motor vehicle to the destination position, the parking procedure probability, and thus also the parking procedure probability value, rises, and on reaching the destination position the parking procedure probability threshold is already exceeded by reaching the destination position. In particular, if the first indicator should then exceed the respective parking procedure probability threshold value, and after the acquisition of the second indicator which can, for example, be an acceleration of the motor vehicle, a performance of the parking procedure can then be recognized. The manual parking procedure can in this way be recognized reliably, and a critical situation thereby prevented.

The ascertainment of a darkening of a light sensor can, for example, both indicate a parking procedure as well as, for example, entry into a tunnel. If, for example, the light sensor ascertains dark surroundings over a predefined period of time, this can in turn speak in favour of a multi-storey car park, so that then, after the period of time and the recognition of the light intensity, the probability of a parking procedure rises, and a higher parking procedure probability value is assigned to the light sensor. If the parking procedure probability value of the light sensor should then be able to exceed the parking procedure probability threshold value, it is again possible here to deduce a parking procedure.

In a further exemplary embodiment, a plurality of first indicators can be acquired, and a performance of the parking procedure is recognized after a predefined parking procedure probability threshold value is exceeded by the total of the plurality of the first indicators is recognized, and after the acquisition of the second indicator. It can, for example, be provided that a respective, in particular fixed, parking procedure probability value is assigned to a respective first indicator, and that the parking procedure is only correspondingly recognized after the total of the plurality of first indicators has exceeded a parking procedure probability threshold value, and after the acquisition of the second indicator. For example, a higher parking procedure probability value can be assigned to reaching the destination position than to a light intensity of a light sensor. The parking procedure probability value of the destination position and the parking procedure probability value of the light intensity can then be totalized, and if the predefined parking procedure probability threshold value is exceeded by the respective parking procedure probability values it is then possible to recognize the performance of the parking procedure if the second indicator, for example the braking of the motor vehicle when driving freely, is acquired. A critical situation in the road traffic can thereby be avoided even more reliably.

According to a further form of embodiment, a plurality of first indicators can be acquired. A respective parking procedure probability value is assigned to a respective first indicator of the plurality of the first indicators. The respective parking procedure probability values are totalized. A performance of the parking procedure is recognized after a predefined parking procedure probability threshold value is exceeded by the total of the parking procedure probability values, and after the acquisition of the second indicator. The respective first indicators can vary in respect of their parking procedure probability. In other words, different first indicators have different parking procedure probabilities. The parking procedure probabilities can, furthermore, vary in accordance with the situation. The parking procedure probability value of a GNSS position can, for example, rise as soon as the motor vehicle approaches a destination position. In other words, this parking procedure probability value can be small at a large distance from the destination position, and can, however, change, in particular rise in value, with an approach to the destination. The parking procedure probability threshold value when parking spaces are recognized can also rise as soon as a plurality of parking spaces is recognized. The respective, changing, parking procedure probability values are then totalized. For example, the changing parking procedure probability value related to the GNSS signal and the changing parking procedure probability value related to the recognition of the parking spaces are totalized. The performance of the parking procedure is only recognized when the total of the individual parking procedure probability values, in other words of the changing individual parking procedure probability values, of the different first indicators exceeds the parking procedure probability threshold value, and after the acquisition of the second indicator, for example an acquired, longer free drive at low speed. For example, with a parking procedure probability value between 0 and 10, wherein 0 indicates no parking procedure and 10 wholly indicates a parking procedure, the parking procedure probability threshold value can, for example, lie at 6. The parking procedure probability value related to the distance from the destination position can, for example, initially be 2, and with respect to the recognition of parking spaces also lie at 2. A totalized value of 4 is thus found, and the parking procedure is thus not yet recognized, since the parking procedure probability threshold value is not exceeded. If, as a result of approaching the destination position, the parking procedure probability value related to the distance from said destination position rises to, for example, 5, then a value of 7 arises in the total of the two parking procedure probability values, whereby the parking procedure probability threshold value of 6 is exceeded. The parking procedure is recognized if the second indicator, for example a strong steering angle, is then acquired. The parking procedure can thus be reliably recognized depending on different parking procedure probability values of the first indicators.

In a further form of embodiment, a negative indicator can be acquired as the first indicator, wherein the negative indicator characterizes a state that differs from a parking procedure and a performance of the parking procedure is ruled out in the presence of a negative indicator. A traffic sign recognition system that recognizes a level crossing sign (St. Andrew's cross) can, for example, be seen as a negative indicator. It can be recognized that the motor vehicle has stopped in front of the St. Andrew's cross or that the motor vehicle is approaching with a low speed. In the case of the St Andrew's cross in particular, the possibility of a parking procedure being involved can be ruled out, since parking is forbidden here. Through the recognition of the St Andrew's cross it can thus be deduced that a parking procedure is not being performed. A position of the motor vehicle on a motorway can also, for example, be acquired as a further negative indicator. If the motor vehicle is located on the motorway and yet is driving slowly, the probability is very high that the motor vehicle is in a traffic jam and is not in a manual parking procedure. The recognition of the slow driving on the motorway can in particular then be employed as a negative indicator. The recognition of a preceding vehicle by means of a radar (moving object) can also, for example, be employed as a negative indicator. If a preceding motor vehicle is moving slowly, the probability that a traffic jam situation is involved, and not a manual parking procedure, is very high. A manual parking procedure can thus reliably be ruled out, so that a critical situation in the road traffic can be prevented.

According to a further form of embodiment, a driving-dynamic parameter of the motor vehicle can in particular be acquired as a second indicator. Through the acquisition, in particular, of driving-dynamic parameters, a manual parking procedure can reliably be deduced. An accelerator pedal position and/or an acceleration can in particular for example be acquired as a driving-dynamic and vehicle-specific indicator. A parking procedure can be recognized very precisely by means, in particular, of the driving-dynamic parameters of the motor vehicle. The manual parking procedure can thereby be recognized particularly reliably.

In a further exemplary embodiment, the parking procedure can be recognized by means of a neural network. A neural network imitates the organizational and processing principles of the human brain. The neural network is, in particular, characterized by an ability to learn, fault tolerance, robustness and the ability to generalize. A neural network is, in particular, a system that consists of many simple processing elements working in parallel, whose function is realized through the network structure, interconnection strengths and the processing that takes place at computing elements or nodes. In other words, the recognition of the manual parking procedure can be performed by means of the neural network, and the parking assistance system can in that way "learn". The neural network can be designed as part of the parking assistance system in the motor vehicle and/or external to the motor vehicle on a cloud basis, and/or external to the parking assistance system on a cloud basis. In particular, the recognition of the manual parking procedure situation can be learnt in a motor-vehicle-specific, surroundings-specific or driver-specific manner, whereby in future the manual parking procedure can be better recognized. A critical situation can thereby advantageously be avoided.

According to a further exemplary embodiment, a configuration of a braking function is activated, in particular a brake booster is activated, as a parking-procedure-specific function. Since a more sensitive setting of the brake is advantageous, in particular during the parking procedure, so that in particular during the slow driving in the parking procedure the motor vehicle can be controlled more sensitively and thus better, it has been found to be advantageous if the brake booster is activated and/or set more sensitively for slow driving and/or the parking procedure. A more accurate and convenient parking procedure can be performed thereby.

A further aspect of the invention relates to a parking assistance system that is designed to perform a method according to one of the preceding aspects.

Yet another further aspect of the invention relates to a motor vehicle with a parking assistance system. The motor vehicle is embodied in particular as a passenger motor vehicle.

Advantageous forms of embodiment of the method are to be seen as advantageous forms of embodiment of the parking assistance system as well as of the motor vehicle. Both the parking assistance system and the motor vehicle have concrete features for this purpose which enable the method or an advantageous form of embodiment thereof to be performed.

Further features of the invention emerge from the claims, the figures and the description of the figures. The features and combinations of features that are cited in the description above, and also the features and combinations of features that are cited in the description of the figures below and/or as shown in the figures alone, can be used not only in the respectively indicated combination but also in other combinations or on their own without departing from the scope of the invention. Embodiments of the invention that are not explicitly shown and explained in the figures, but emanate and are producible from the explained embodiments by virtue of self-contained combinations of features, are therefore also intended to be regarded as included and as disclosed. Embodiments and combinations of features that therefore do not have all the features of an independent claim as originally worded are also intended to be regarded as disclosed. Embodiments and combinations of features that go beyond or differ from the combinations of features set out in the back-references of the claims, should furthermore be considered to be disclosed, in particular by the embodiments set out above.

The invention will now be explained in more detail on the basis of preferred exemplary embodiments and with reference to the attached drawings.

Figure 2:
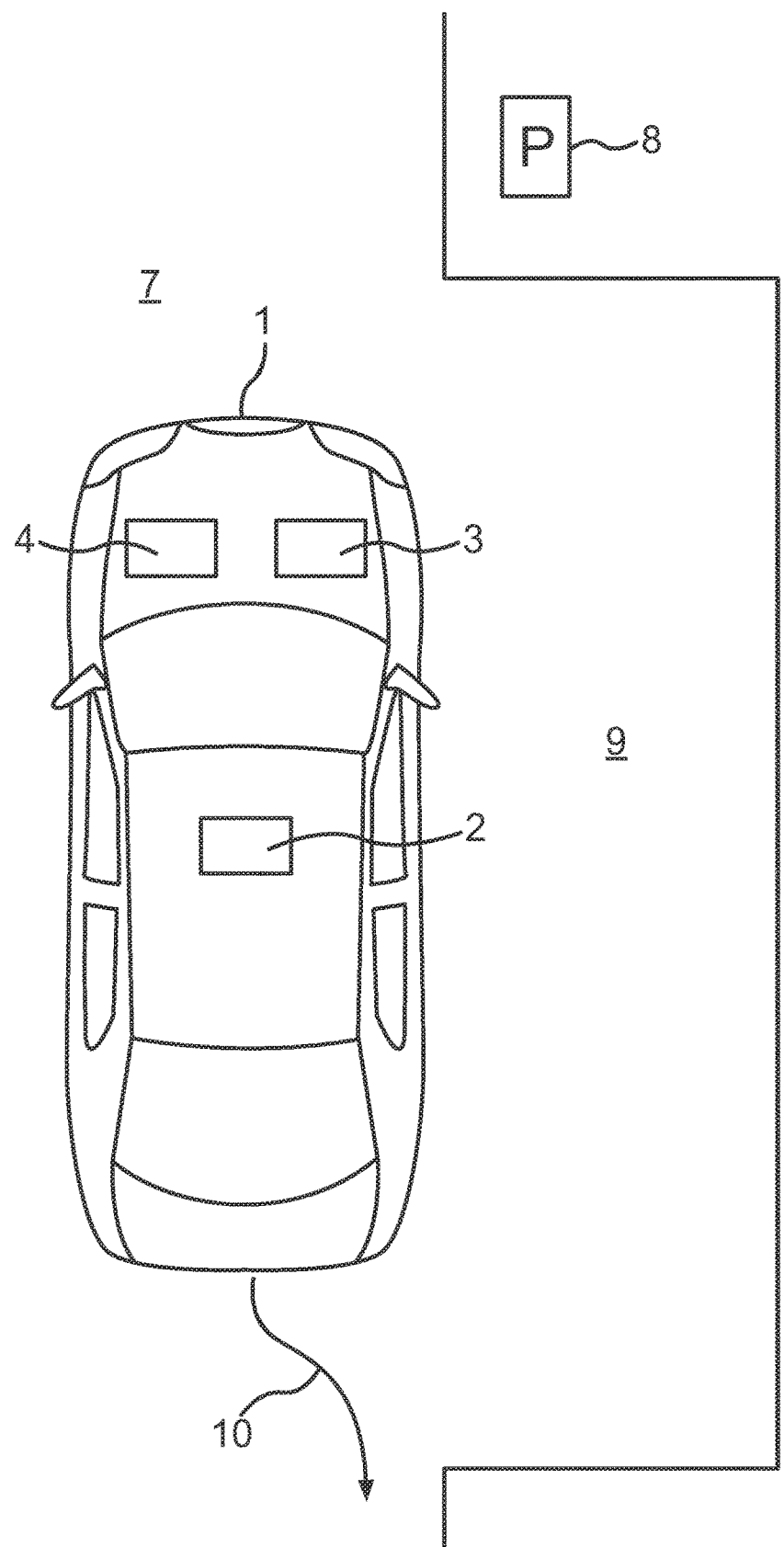

In the figures:

FIG. 1 shows a schematic plan view of an exemplary embodiment of a motor vehicle according to the invention; and FIG. 2 shows a further schematic plan view of an exemplary embodiment of the motor vehicle in a parking situation.

The same reference codes are given in the figures to identify elements that are identical and have the same functions.

FIG. 1 shows a plan view of a motor vehicle 1 in accordance with an embodiment of the invention. In the present case, the motor vehicle 1 is formed as a passenger motor vehicle. The motor vehicle 1 comprises a parking assistance system 2. The parking assistance system 2 is designed to support the driver of the motor vehicle 1 during a manual parking procedure of the motor vehicle 1.

The motor vehicle 1 can comprise a first acquisition device 3 and a second acquisition device 4. The first acquisition device 3 and/or the second acquisition device 4 can, for example, be designed as a camera, an ultrasonic sensor, a lidar sensor or a radar sensor. The first and the second acquisition device 3, 4 can here be identical or different in design. It can, in particular, be provided that a first indicator that characterizes the parking procedure in a surroundings-specific manner is acquired by means of the first acquisition device 3. A second indicator that characterizes the parking procedure in a motor-vehicle-specific manner can in particular be acquired by means of the second acquisition device 4. The parking assistance system 2 is designed in such a way that a performance of the parking procedure is only recognized when at least the first indicator is acquired and, after the acquisition of the first indicator, at least the second indicator is acquired.

The detection of at least two parking spaces in the course of a predefined path distance can, for example, be considered as a surroundings-specific indicator. As a surroundings-specific indicator it is, furthermore, possible to detect whether a few parking spaces have already been recognized in a predefined path distance travelled, so that the motor vehicle 1 is located in a car park and that the driver would himself like to park the motor vehicle 1 in the near future. Reaching a destination position which has, in particular, been entered into a global navigation satellite system (GNSS) can equally be acquired as a surroundings-specific indicator. It is furthermore possible, for example through the recognition of traffic signs, for example a speed limit for the motor vehicle 1 and/or a car park sign 8 (FIG. 2), to deduce a future parking procedure. It is also possible that a detection of a multi-storey car park or a car park is reported by an external control device, for example by a navigation device and/or by data services, so that the parking assistance system 2 knows that it is located in a parking lot. GNSS reference points can, furthermore, be used, so that the motor vehicle 1 can, for example, "remember where it has already been" on the basis of the reference points, and that a multi-storey car park or a car park 9 (FIG. 2) is recognized again. It is also possible that a light sensor is employed, in combination with a clock time, as a surroundings-specific indicator so that, for example, entry into "dark" surroundings during the day can be ascertained, whereupon a multi-storey car park can be deduced. An incline, for example that of a ramp in a multi-storey car park, can further be recognized as a surroundings-specific indicator. If the motor vehicle 1 travels over a short path with a strong gradient, it could in particular here be a ramp of a multi-storey car park. Strong inclines following each other shortly in sequence can, further, be recognized as alternating ramps in a multi-storey car park. It is also possible that a multi-storey car park can be recognized when driving along a 360° curve. Such 360° curves are in particular followed when ascending in the multi-storey car park. A multi-storey car park can, in particular, be reliably recognized when an incline and a 360° curve are recognized. It can further be provided that typical radii of a multi-storey car park ascent are recognized and can thus be employed as a surroundings-specific indicator.

A predefined vehicle trajectory 10 (FIG. 2), for example an S-curve, an X perpendicular forward movement or an I perpendicular reverse movement, can in particular be acquired as a motor-vehicle-specific indicator. It is also possible that the braking of the motor vehicle 1 when moving freely without the detection of an object by a camera and/or a radar and/or an ultrasonic sensor of the motor vehicle 1 is acquired as the motor-vehicle-specific indicator. Further, the acquisition of a longer free travel at low speed, which can be interpreted as the search for a parking space, in particular when no other motor vehicles are reported in front or when in general a higher speed limit applies, is acquired as the motor-vehicle-specific indicator. An accelerator pedal position—there is not much acceleration and it is not strong when manoeuvring—can further be recognized as, in particular, a motor-vehicle-specific indicator. An acceleration of the motor vehicle 1 can also be acquired as a motor-vehicle-specific indicator, since in particular there is little acceleration when manoeuvring. A steering angle can, further, be acquired as a motor-vehicle-specific indicator, since, in particular during a parking procedure, a strong steering angle is used whereas high steering angles are not recorded when the motor vehicle 1 is driving on the road other than during a parking procedure. A predefined time after which the motor vehicle 1 has been in a predefined manoeuvring mode can also be acquired as a motor-vehicle-specific indicator, so that this manoeuvring mode is only active for a predefined period of time. A predefined path distance after the motor vehicle 1 is in a manoeuvring mode can also be acquired as a motor-vehicle-specific indicator, and the parking-procedure-specific function thus only activated for a predefined path distance. It can further be provided that an actuation device is arranged in the motor vehicle 1 which can be actuated by the driver himself, whereby the driver indicates a manual parking procedure to the parking assistance system 2. A low motor vehicle speed, in particular over a longer path distance and/or over a longer time, can further be acquired as a motor-vehicle-specific indicator in order to recognize the manual parking procedure. Engaging a reverse gear can also be acquired as a motor-vehicle-specific indicator.

It is in particular provided that after the recognition of a performance of the parking procedure, a parking-procedure-specific function of the motor vehicle 1 is activated to support the driver in the parking procedure. A configuration of a braking function can, for example, be activated as a parking-procedure-specific function; in particular, a brake booster 5 of the motor-vehicle 1 can be activated, so that more sensitive braking is enabled during the parking procedure.

It can further be provided that the motor vehicle 1 comprises a neural network 6, whereby the parking assistance system 2 in particular is able to learn to prevent a critical situation in future, and can thereby better recognize the manual parking procedure. In particular, past data can be accessed so that by means of the neural network 6 the manual parking procedure can, on the basis of the past, be better recognized in future.

It can in particular be provided that a performance of the parking procedure is recognized after acquiring the exceeding of a predefined indicator threshold value of the first indicator and after acquiring the second indicator. It can further be provided that a performance of the parking procedure is only recognized after an acquisition of at least two different first indicators and after the acquisition of the second indicator. It can further be provided that the at least one first indicator is evaluated in terms of a probability of a parking procedure, and a performance of the parking procedure is recognized after a predefined parking procedure threshold probability value is exceeded and after the acquisition of the second indicator. In particular here, the parking procedure probabilities can vary depending on the situation. The parking procedure probability value can, for example, rise with the approach to a destination position.

It can, further, be provided that a plurality of first indicators is acquired, and a performance of the parking procedure is recognized after a predefined parking procedure probability threshold value is exceeded by the total of the plurality of the first indicators, and after the acquisition of the second indicator. In particular, the different first indicators have different, fixed parking procedure probability threshold values for this purpose, and the parking procedure is only recognized after the parking procedure probability threshold value has been exceeded by the total of the fixedly assigned parking procedure probability values and after the acquisition of the second indicator.

It can further be provided that a plurality of first indicators is acquired by means of the first acquisition device 3, and a respective parking procedure probability value is assigned to a respective first indicator of the plurality of first indicators by the parking assistance system 2. The respective parking procedure probability values can then be totalized and a performance of the parking procedure is recognized after a predefined parking procedure probability threshold value is exceeded by the total of the parking procedure probability values, and after the acquisition of the second indicator. In particular, the respective indicators have parking procedure probability values that change depending on the situation, and the parking procedure is recognized after the parking procedure probability threshold value is exceeded by the total of the varying parking procedure probability values and after the acquisition of the second indicator.

FIG. 2 shows the motor vehicle 1 in a parking procedure situation. The motor vehicle 1 is located in a surroundings 7 of the motor vehicle 1 which, in particular, can in the present case be a multi-story car park. The motor vehicle 1 can in particular have already established surroundings-specific indicators, for example a light intensity in the multi-storey car park, by means of the first acquisition device 3. The motor vehicle 1 can, furthermore, already have acquired vehicle-specific indicators that characterize a parking procedure with the second acquisition device 4. A traffic sign 8, in particular a multi-story car park sign 8, can, for example, have been acquired by means of the first acquisition device 3. It can furthermore in particular be provided that a free parking space 9 has been acquired as a first indicator by means of the acquisition device 3, and the motor vehicle 1 is located at that time in particular at the side of the parking space 9. On the basis of the traffic sign 8, and on the basis of the free parking space 9, and on the basis of the fact that the motor vehicle 1 is moving slowly as the second indicator, the parking assistance system 2 can in particular deduce that the motor vehicle 1 is in a manual parking manoeuvre.

After the recognition of at least one first indicator, for example after the recognition of the parking space 9 and/or after the recognition of the traffic sign 8, at least the second indicator is acquired which is recognized, for example, through the slow driving of the motor vehicle 1 and/or through an accelerator pedal position of the motor vehicle 1 and/or through a steering wheel angle of the motor vehicle 1. A performance of the manual parking procedure is recognized after the acquisition of the at least one first indicator and after the acquisition of the at least one second indicator. It can further be concluded that a manual parking procedure is being performed if the motor vehicle 1 has, for example, the driving trajectory 10. In particular, the performance of a parking-procedure-specific function of the motor vehicle 1 after the recognition of the parking procedure is made possible.

It can further be provided that a negative indicator is acquired as a first indicator, wherein the negative indicator characterizes a state that is different from a parking procedure, and that in the presence of a negative indicator a performance of the parking procedure is ruled out. If, for example, the motor vehicle 1 is located on a motorway, which can, for example, be verified by a GNSS signal, and is moving slowly, it can be assumed that a parking procedure is not taking place, but rather, for example, a traffic jam on the motorway. The parking-procedure-specific function is in particular then not activated.

The invention claimed is:

1. A method for supporting a driver of a motor vehicle in a manual parking procedure of the motor vehicle in a surroundings of the motor vehicle, the method comprising:
   acquiring at least one indicator characterizing the parking procedure;
   recognizing, depending on an evaluation of the at least one indicator, a performance of a parking procedure of the motor vehicle;
   depending thereon, activating at least one parking-procedure-specific function of the motor vehicle to support the driver during the parking procedure of the motor vehicle; and
   recognizing the performance of the parking procedure of the motor vehicle when at least one first indicator of the at least one indicator that characterizes the parking procedure in a surroundings-specific manner is acquired and when, after the acquisition of the at least one first indicator, at least one second indicator of the at least one indicator that characterizes the parking procedure in a motor-vehicle-specific manner is acquired,
   wherein the at least one first indicator is an indicator of at least one of a parking space and a car park in the surroundings of the motor vehicle for parking the motor vehicle,
   wherein one of the at least one first indicator is based on exceeding a predetermined threshold value of an incline of the vehicle, and
   wherein one of the at least one second indicator is based on an accelerator pedal position of the vehicle.

2. The method according to claim 1, wherein the performance of the parking procedure is recognized after an acquisition of at least two different first indicators and after the acquisition of the at least one second indicator.

3. The method according to claim 1, wherein the at least one first indicator is evaluated in terms of a probability of a parking procedure of the motor vehicle, and the performance of the parking procedure is recognized after a predefined parking procedure threshold probability value is exceeded and after the acquisition of the at least one second indicator.

4. The method according to claim 1, wherein a plurality of first indicators is acquired, and the performance of the parking procedure of the motor vehicle is recognized after a predefined parking procedure probability threshold value is exceeded by a total parking procedure probability value of the plurality of the first indicators, and after the acquisition of the at least one second indicator.

5. The method according to claim 1, further comprising:
   acquisition of a plurality of first indicators;
   assignment of a respective parking procedure probability value for a respective first indicator to the plurality of the first indicators;
   totalizing the respective parking procedure probability values; and
   recognizing the performance of the parking procedure of the motor vehicle after exceeding a predefined parking procedure probability threshold value by the total of the parking procedure probability values and after the acquisition of the at least one second indicator.

6. The method according to claim 1, wherein a negative indicator is acquired as another of the at least one first indicators, wherein the negative indicator characterizes a state that differs from a parking procedure and the performance of the parking procedure is ruled out in the presence of a negative indicator.

7. The method according to claim 1, wherein a driving-dynamic parameter of the motor vehicle is acquired as another of the at least one second indicators.

8. The method according to claim 1, wherein the parking procedure is recognized by means of a neural network.

9. The method according to claim 1, wherein a brake booster is activated as the at least one parking-procedure-specific function.

10. A parking assistance system that is configured to perform a method according to claim 1.

11. A motor vehicle with a parking assistance system according to claim 10.

* * * * *